United States Patent
Hu et al.

(10) Patent No.: US 10,528,082 B2
(45) Date of Patent: Jan. 7, 2020

(54) ELECTRONIC DEVICE WITH DETACHABLE BATTERY COVER

(71) Applicant: JRD Communication Inc., Shenzhen (CN)

(72) Inventors: Zhiguo Hu, Shenzhen (CN); Dongshui Su, Shenzhen (CN); Pengfei Liu, Shenzhen (CN); Di Liang, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 85 days.

(21) Appl. No.: 15/744,802

(22) PCT Filed: Mar. 13, 2017

(86) PCT No.: PCT/CN2017/076477
§ 371 (c)(1),
(2) Date: Jan. 14, 2018

(87) PCT Pub. No.: WO2018/149003
PCT Pub. Date: Aug. 23, 2018

(65) Prior Publication Data
US 2019/0011953 A1    Jan. 10, 2019

(30) Foreign Application Priority Data
Feb. 15, 2017    (CN) .................... 2017 2 0138160 U

(51) Int. Cl.
*G06F 1/16*    (2006.01)
*H04M 1/02*    (2006.01)
*H01M 2/10*    (2006.01)

(52) U.S. Cl.
CPC .......... *G06F 1/1635* (2013.01); *G06F 1/1626* (2013.01); *G06F 1/1658* (2013.01); *H01M 2/1022* (2013.01); *H04M 1/0262* (2013.01)

(58) Field of Classification Search
CPC ..... H04M 1/0262; H04M 1/02; G06F 1/1656; G06F 1/1626; G06F 1/16; G06F 1/1635; G06F 1/1658; H04R 1/02; H01M 2/1022
See application file for complete search history.

(56) References Cited

U.S. PATENT DOCUMENTS

2011/0195289 A1 *    8/2011    Ouyang ................. H01M 2/00
                                                                429/97
2013/0303238 A1    11/2013    Huang et al.
(Continued)

FOREIGN PATENT DOCUMENTS

CN        201708843        1/2011
CN        202524448        11/2012
(Continued)

*Primary Examiner* — Jinhee J Lee
*Assistant Examiner* — Ingrid D Wright

(57) ABSTRACT

An electronic device with a detachable battery cover is described. The electronic device comprises a device body, a battery cover, a first attachment body disposed on the device body, and a second attachment body disposed on the battery cover. The first attachment body and the second attachment body are attached to each other to connect the device body and the battery cover. The device body and the battery cover of the present disclosure are connect to each other through the first attachment body and the second attachment body so that the battery cover is firmly attached on the electronic device and easy to detach the battery cover. Attachment capacity of the first attachment body and the second attachment body will not be weakened with the increase in the number of detachments so that service life can be extend and the quality of the electronic device can be improved.

10 Claims, 4 Drawing Sheets

(56) References Cited

U.S. PATENT DOCUMENTS

2014/0187289 A1* 7/2014 Cataldo ................ H04M 1/21
                                                                             455/557
2014/0272509 A1* 9/2014 Thomas .............. H01M 2/1027
                                                                              429/99

FOREIGN PATENT DOCUMENTS

| CN | 204230313 | 3/2015 |
| CN | 204345191 | 5/2015 |

\* cited by examiner

ELECTRONIC DEVICE WITH DETACHABLE BATTERY COVER

RELATED APPLICATIONS

This application is a National Phase of PCT Patent Application No. PCT/CN2017/076477 having International filing date of Mar. 13, 2017, which claims the benefit of priority of Chinese Patent Application No. 201720138160.1 filed on Feb. 15, 2017. The contents of the above applications are all incorporated by reference as if fully set forth herein in their entirety.

FIELD AND BACKGROUND OF THE DISCLOSURE

The present disclosure relates to a field of electronic technology, and more particularly to an electronic device with a detachable battery cover.

Removable battery covers used in devices, such as current mobile terminals, are basically snap-fit battery covers. Connection between a device body and a battery cover can be implemented through a buckle structure of the battery cover and a lock structure of the battery cover device body. Because the snap-fit battery cover is probably not snapped in place properly, there is a gap between the device body and the battery cover, or the snap-fit battery cover may be snapped too tight so that the battery cover is hard to be disassembled, which is inconvenient for the user.

In one issue, number of fasteners disposed on the snap-fit battery cover has to be set according to the size of the screen. As phone screens are getting larger, more fasteners for the battery cover are needed, so that producing the battery cover is more difficult. When deviation of the size of the fastener occurs, there may be an unavoidable gap after the battery cover is snapped on.

SUMMARY OF THE DISCLOSURE

In order to solve the problem of the above-mentioned prior art, one objective of the present disclosure is to provide an electronic device with a detachable battery cover.

The present disclosure provides an electronic device with a detachable battery cover, which comprises a device body, a battery cover, at least one first attachment body, and at least one second attachment body. The first attachment body is disposed on the device body. The second attachment body is disposed on the battery cover. The first attachment body and the second attachment body are attached to each other to connect the device body and the battery cover.

Further, the device body comprises a bottom shell and a front shell fastened to the bottom shell. A first receiving groove is formed on a fastening edge of the front shell. The first attachment body is received in the first receiving groove.

Further, a through hole is opposite to the first receiving groove and formed on the bottom shell. The first attachment body passes into the through hole.

Further, a second receiving groove is opposite to the first receiving groove and formed on the battery cover. The second attachment body is disposed in the second receiving groove.

Further, the first attachment body and the second attachment body are attached to each other by magnetic attraction.

Further, the first attachment body and the second attachment body are attached to each other by vacuum attraction.

In particular, the electronic device is a smart phone or a tablet computer.

Advantageous effects of the present disclosure: the device body and the battery cover of the present disclosure are connected to each other through the first attachment body and the second attachment body so that the battery cover is firmly attached to the electronic device, and it is easy to detach the battery cover. Besides, attachment capacity of the first attachment body and the second attachment body will not be weakened with the increase in the number of detachments so that service life can be extend and quality of the electronic device can be improved.

BRIEF DESCRIPTION OF THE SEVERAL VIEWS OF THE DRAWINGS

The following description in conjunction with the accompanying drawings, the above and other aspects, features, and advantages of embodiments of the present disclosure will become more apparent from the accompanying drawings in which.

DESCRIPTION OF SPECIFIC EMBODIMENTS OF THE INVENTION

Figure 1:
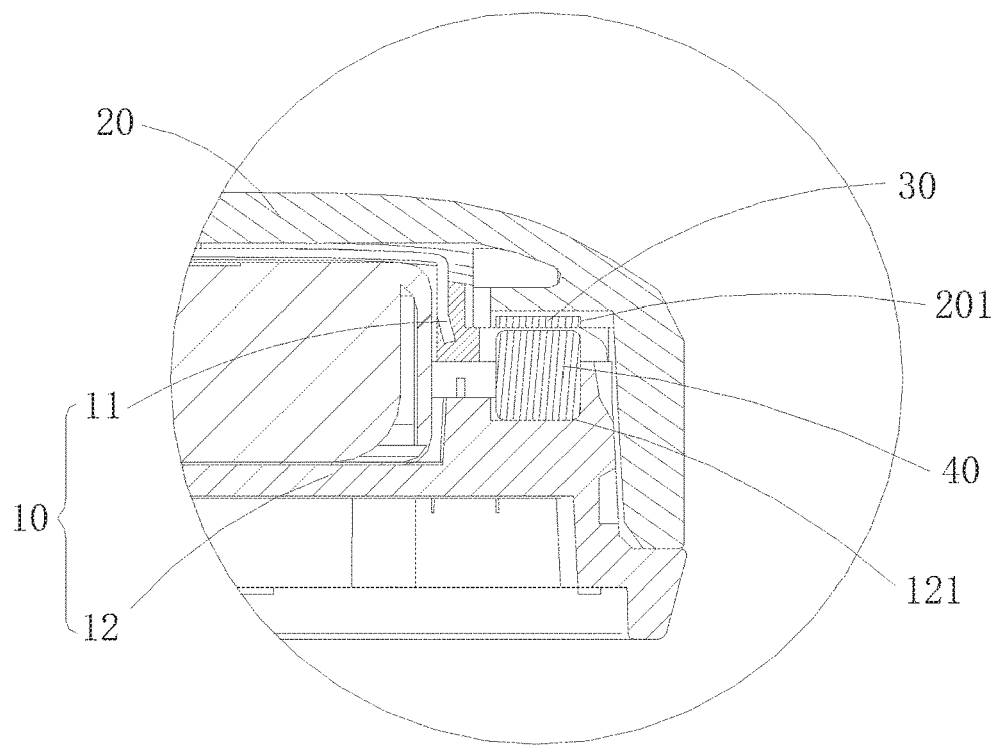
FIG. 1 is a structural schematic diagram of an electronic device according to one embodiment of the present disclosure.

Hereinafter, the embodiments of the present disclosure are described in detail with reference to the accompanying drawings. However, it is embodied in many different forms and embodiments of the present disclosure, and the present disclosure should not be construed as limited to the particular embodiments set forth herein. Rather, these embodiments are given in order to explain the principles of the disclosure and its practical application to thereby enable others skilled in the art to understand the disclosure for various embodiments and various modifications as suited to the particular use contemplated.

The same reference numerals throughout the specification and the drawings may be used to denote like elements. It will be understood that, although the terms may be used herein "first", "second", etc., to describe various elements, these elements should not be limited by these terms. These terms are only used to distinguish one element from another element.

Referring to FIG. 1, a preferred embodiment of the present disclosure provides an electronic device with a detachable battery cover, which comprises a device body 10, a battery cover 20, at least one first attachment body 30, and at least one second attachment body 40. The first attachment body 30 is disposed on the device body 10. The second attachment body 40 is disposed on the battery cover 20. The first attachment body 30 and the second attachment body 40 are attached to each other to connect the device body 10 and the battery cover 20. Although one first attachment body 30 and one second attachment body 40 are disclosed in FIG. 1, and it should be noted that the number of the first attachment body 30 and the second attachment body 40 is not limited in the present disclosure, and the number can be set according to actual needs. In addition, it should be noted that the electronic device of the embodiment is a smart phone or a tablet computer.

Figure 2:
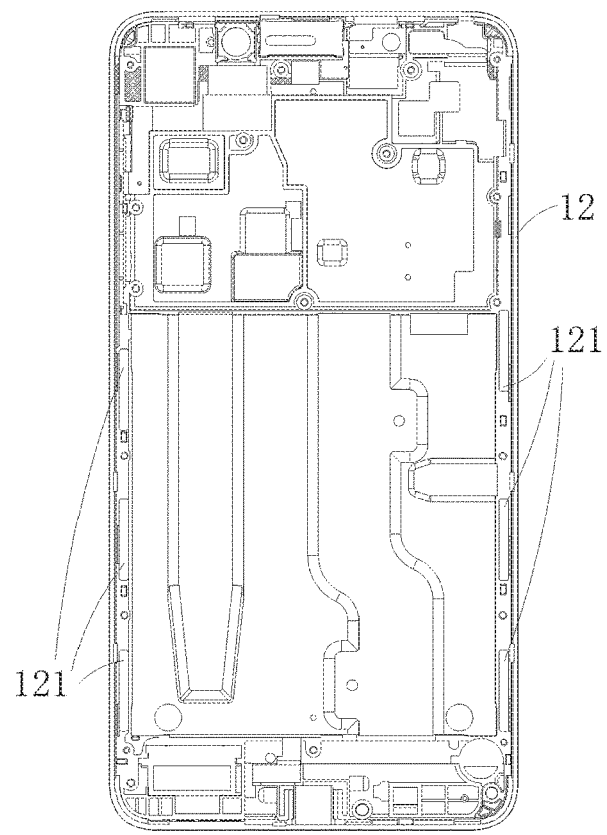
FIG. 2 is a structural schematic diagram of a front shell according to one embodiment of the present disclosure.
Figure 3:
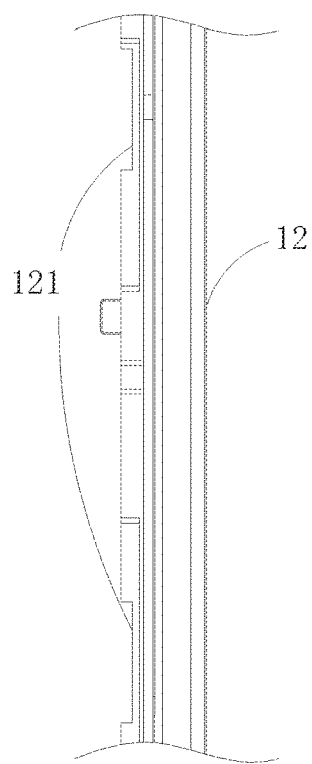
FIG. 3 is a partial sectional diagram of the front shell according to one embodiment of the present disclosure.
Figure 4:
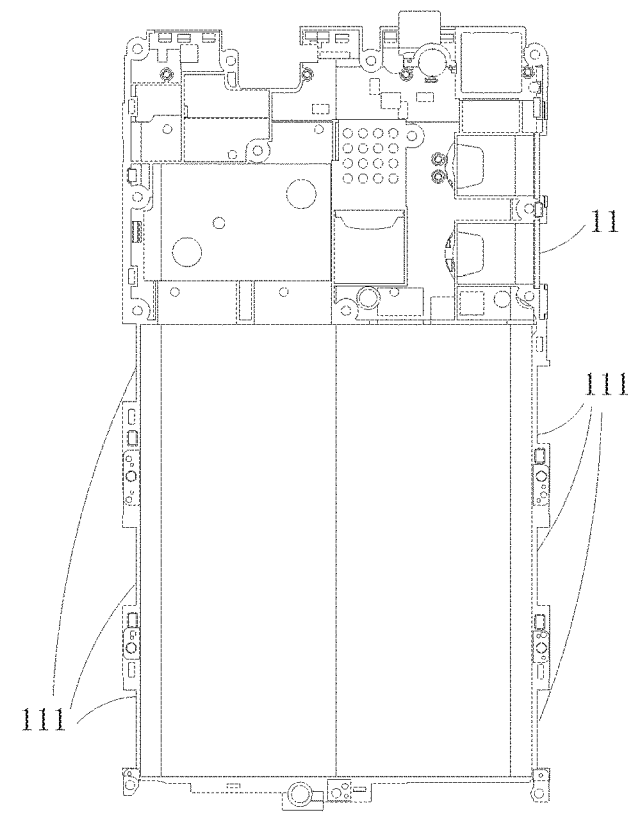
FIG. 4 is a structural schematic diagram of a bottom shell according to one embodiment of the present disclosure.
Figure 5:
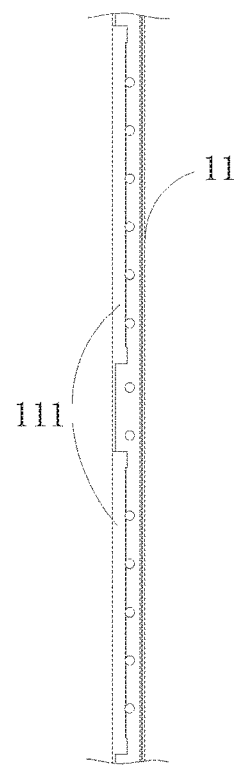
FIG. 5 is a partial sectional diagram of the bottom shell according to one embodiment of the present disclosure.
Figure 6:
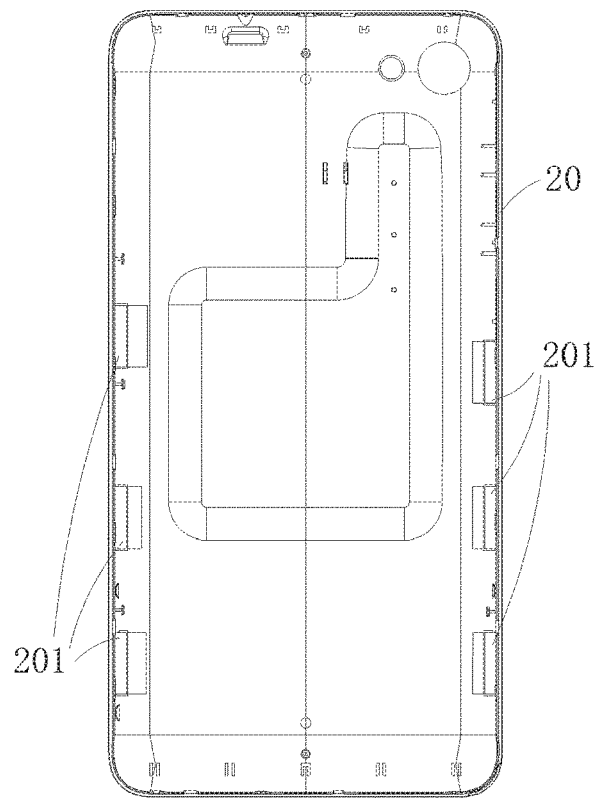
FIG. 6 is a structural schematic diagram of a battery cover according to one embodiment of the present disclosure.
Figure 7:
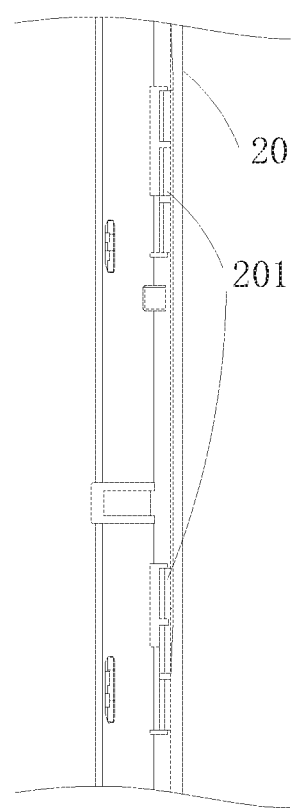
FIG. 7 is a partial sectional diagram of the battery cover according to one embodiment of the present disclosure.

Referring to FIGS. 2 and 3, the electronic device further comprises a bottom shell 11 and a front shell 12 fastened the bottom shell 11, and a first receiving groove 121 is formed on a fastening edge of the front shell 12. The first receiving groove 121 matches with the first attachment body 30, and the shape and size of the first receiving groove 121 and the first attachment body 30 are equal so that the first attachment body 30 can be received in the first receiving groove 121. The first attachment body 30 can be fixed in the first receiving groove 121 through glue bonding, welding, or screwing, and is not limited in the present disclosure. Six first receiving grooves 121 are disclosed in FIG. 2, and two first receiving grooves 121 are disclosed in FIG. 3, and it should be noted that the number of first receiving grooves 121 is not limited in the present disclosure, and the number can be set according to actual needs.

Referring to FIGS. 4, 5, 6, and 7, a through hole 111 opposite to the first receiving groove 121 is formed on the bottom shell 11, and the first attachment body 30 is mounted through the through hole 111. A second receiving groove 201 opposite to the first receiving groove 121 is formed on the battery cover 20. The through hole 111 and the second receiving groove 201 match with the second attachment body 40, and the shape and size of the through hole 111, the second receiving groove 201 and the second attachment body 40 are equal so that the second attachment body 40 can be passed into the through hole 11 and received in the second receiving groove 201. The second attachment body 40 can be fixed in the second receiving groove 201 through glue bonding, welding, or screwing, and is not limited in the present disclosure. Six through holes 111 are disclosed in FIG. 4, and two through holes 111 are disclosed in FIG. 5. Six second receiving grooves 201 are disclosed in FIG. 6, and two second receiving grooves 201 are disclosed in FIG. 7. It should be noted that the number of through holes 111 and second receiving grooves 201 are not limited in the present disclosure, and the number can be set according to actual needs.

In the embodiment, the first attachment body 30 and the second attachment body 40 are attached to each other by magnetic attraction. For example, the first attachment body 30 and the second attachment body 40 are magnets, and both of them use magnetic attraction with different magnetic poles. The first attachment body 30 may be a magnet, and the second attachment body 40 is made of material magnetically attracted by the magnet, such as iron. Number, shape, and size of the first attachment body 30 and the second attachment body 40 are equal, which can be arrangement according to actual needs, and is not limited by the present disclosure. In the specific implementation, the place of the first attachment body 30 and the second attachment body 40 are oppositely arranged. The first attachment body 30 of the electronic device 10 and the second attachment body 40 of the battery cover 20 are oppositely attached when the electronic device 10 connects to the battery cover 20 so that the electronic device 10 and the battery cover 20 are connected to each other.

As another embodiment of the present disclosure, the first attachment body 30 and the second attachment body 40 are attached to each other by vacuum attraction. For example, the first attachment body 30 and the second attachment body 40 can be made of silica gel or other soft colloidal material. Both of them are connected and pushed against each other to squeeze out air between them so that atmospheric pressure from outside is greater than the pressure between them, and the first attachment body 30 and the second attachment body 40 are attached to each other. It should be stated that the first attachment body 30 and the second attachment body 40 can be attached to each other according to other suitable methods.

As described above, the device body and the battery cover of the present disclosure are connect to each other through the first attachment body and the second attachment body so that the battery cover is firmly attached on the electronic device and easy to detach the battery cover. Besides, attachment capacity of the first attachment body and the second attachment body will not be weakened with the increase in the number of detachments so that service life can be extend and quality of the electronic device can be improved.

While shown already with reference to specific embodiments and described in the present invention, those skilled in the art will appreciate that, without departing from the spirit and scope of the invention being indicated by the claims and their equivalents as defined, may be made in the form here and various changes in detail.

What is claimed is:

1. A electronic device with a detachable battery cover, comprising:
   a bottom shell;
   a front shell fastened to the bottom shell;
   a battery cover;
   at least one first attachment body disposed on the front shell; and
   at least one second attachment body disposed on the battery cover;
   wherein the first attachment body and the second attachment body are connected and pushed against each other to squeeze out air between the first attachment body and the second attachment body such that the first attachment body and the second attachment body are attached to each other;
   wherein a first receiving groove is formed on a fastening edge of the front shell, and the first attachment body is received in the first receiving groove; a through hole opposite to the first receiving groove is formed on the bottom shell, and the first attachment body is mounted through the through hole.

2. The electronic device with the detachable battery cover of claim 1, wherein a second receiving groove opposite to the first receiving groove is formed on the battery cover, and the second attachment body is disposed in the second receiving groove.

3. A electronic device with the detachable battery cover, comprising:
   a device body;
   a battery cover;
   at least one first attachment body disposed on the device body; and
   at least one second attachment body disposed on the battery cover;
   wherein the first attachment body and the second attachment body are attached to each other to connect the device body and the battery cover;
   wherein the first attachment body and the second attachment body are attached to each other by magnetic attraction;

wherein the device body comprises a bottom shell and a front shell fastened the bottom shell; a first receiving groove is formed on a fastening edge of the front shell, and the first attachment body is received in the first receiving groove.

4. The electronic device with the detachable battery cover of claim 3, wherein a through hole is opposite to the first receiving groove and formed on the bottom shell, and the first attachment body passes into the through hole.

5. The electronic device with the detachable battery cover of claim 3, wherein a second receiving groove is opposite to the first receiving groove and formed on the battery cover, and the second attachment body is disposed in the second receiving groove.

6. The electronic device with the detachable battery cover of claim 5, wherein the electronic device is a smart phone or a tablet computer.

7. A electronic device with a detachable battery, comprising:
- a device body;
- a battery cover;
- at least one first attachment body disposed on the device body; and
- at least one second attachment body disposed on the battery cover;

wherein the first attachment body and the second attachment body are attached to each other to connect the device body and the battery cover;

wherein the first attachment body and the second attachment body are attached to each other by vacuum attraction;

wherein the device body comprises a bottom shell and a front shell fastened the bottom shell; a first receiving groove is formed on a fastening edge of the front shell, and the first attachment body is received in the first receiving groove.

8. The electronic device with the detachable battery of claim 7, wherein a through hole is opposite to the first receiving groove and formed on the bottom shell, and the first attachment body passes into the through hole.

9. The electronic device with the detachable battery of claim 7, wherein a second receiving groove is opposite to the first receiving groove and formed on the battery cover, and the second attachment body is disposed in the second receiving groove.

10. The electronic device with the detachable battery of claim 9, wherein the electronic device is a smart phone or a tablet computer.

* * * * *